(12) United States Patent
Limontini

(10) Patent No.: US 8,419,046 B2
(45) Date of Patent: Apr. 16, 2013

(54) FIELD LITTER CARRIER

(76) Inventor: Flavio Limontini, Novara (IT)

( * ) Notice: Subject to any disclaimer, the term of this patent is extended or adjusted under 35 U.S.C. 154(b) by 165 days.

(21) Appl. No.: 12/869,727

(22) Filed: Aug. 26, 2010

(65) Prior Publication Data

US 2011/0049841 A1 Mar. 3, 2011

(30) Foreign Application Priority Data

Aug. 27, 2009 (IT) ............................. MI2009U0275
Mar. 1, 2010 (CN) ......................... 2010 3 0124921
Mar. 24, 2010 (UA) .................................. P372/2010

(51) Int. Cl.
   *B62B 1/04* (2006.01)
(52) U.S. Cl.
   USPC ..................................................... 280/640
(58) Field of Classification Search .................. 280/638, 280/639, 640, 641, 651, 652, 654, 655, 659, 280/35, 38, 40, 63, 47.131, 47.16, 47.17, 280/47.18, 47.19, 47.2, 47.34, 47.3, 47.24; 29/401.1
See application file for complete search history.

(56) References Cited

U.S. PATENT DOCUMENTS

| | | | | |
|---|---|---|---|---|
| 577,364 | A * | 2/1897 | Henzie | 280/38 |
| 627,954 | A * | 6/1899 | Dixon | 280/640 |
| 645,524 | A * | 3/1900 | Green | 280/640 |
| 649,951 | A * | 5/1900 | Purcell | 280/640 |
| 669,222 | A * | 3/1901 | Ruher | 280/40 |
| 702,801 | A * | 6/1902 | Kremer | 280/640 |
| 704,426 | A * | 7/1902 | Allen | 296/20 |
| 910,728 | A * | 1/1909 | Russell | 296/20 |
| 1,347,466 | A * | 7/1920 | Raymond | 280/640 |
| 1,483,607 | A * | 2/1924 | Horst | 296/20 |
| 1,498,095 | A * | 6/1924 | Hayes | 280/47.16 |
| 1,736,795 | A * | 11/1929 | McKee | 280/47.16 |
| 2,276,236 | A | 3/1942 | Lattimer | |
| 2,416,492 | A * | 2/1947 | Neeley | 280/47.3 |
| 2,429,028 | A * | 10/1947 | Neeley | 280/42 |
| 2,553,659 | A * | 5/1951 | Lazell et al. | 280/641 |
| 2,596,986 | A * | 5/1952 | Curtis | 280/641 |
| 2,715,030 | A * | 8/1955 | Peterson | 280/30 |
| 2,789,829 | A * | 4/1957 | Parker | 280/654 |
| 2,918,296 | A * | 12/1959 | Goodale | 280/645 |
| 2,919,138 | A * | 12/1959 | Brower et al. | 280/35 |
| 2,970,846 | A * | 2/1961 | Boston | 280/40 |
| 2,979,338 | A * | 4/1961 | Dwyer | 280/47.3 |
| 2,992,011 | A * | 7/1961 | Becan | 280/654 |
| 3,222,100 | A * | 12/1965 | Lindzy | 296/20 |
| 3,223,429 | A * | 12/1965 | Hastings | 280/641 |
| 3,236,537 | A * | 2/1966 | Eckman | 280/47.18 |
| 3,367,676 | A * | 2/1968 | Pearson et al. | 280/654 |
| 3,388,919 | A * | 6/1968 | Waag | 280/654 |
| 3,456,959 | A * | 7/1969 | Hemphill et al. | 280/47.3 |
| 3,687,475 | A * | 8/1972 | Wiczer | 280/641 |
| 3,690,692 | A * | 9/1972 | Florian et al. | 280/654 |
| 3,782,749 | A * | 1/1974 | Wiczer | 280/641 |
| 3,820,807 | A * | 6/1974 | Curran | 280/47.3 |
| 3,860,254 | A * | 1/1975 | Wegener | 280/652 |

(Continued)

*Primary Examiner* — Brodie Follman
(74) *Attorney, Agent, or Firm* — Joseph H. Taddeo

(57) ABSTRACT

A field stretcher carrier with a structure formed by a front frame section and a rear frame section that are coupled together. The attachment systems that allow a stretcher to be secured to the structure favorably include at least one pair of clamps at the ends of each frame section. The clamps are fitted to a rigid cross bar and can slide up and down the axis of the cross bar toward and away from each other.

19 Claims, 8 Drawing Sheets

U.S. PATENT DOCUMENTS

| | | | | |
|---|---|---|---|---|
| 4,006,500 | A | 2/1977 | Bonifay | |
| 4,063,744 | A * | 12/1977 | Fraser | 280/42 |
| 4,138,140 | A * | 2/1979 | O'Brian et al. | 280/652 |
| 4,337,966 | A * | 7/1982 | Stevens | 280/645 |
| 4,444,405 | A * | 4/1984 | Barrus | 280/47.3 |
| 4,579,357 | A * | 4/1986 | Webster | 280/47.331 |
| 4,712,803 | A * | 12/1987 | Garcia | 280/47.331 |
| 4,733,905 | A * | 3/1988 | Buickerood et al. | 297/129 |
| 4,822,065 | A * | 4/1989 | Enders | 280/47.331 |
| 4,824,127 | A * | 4/1989 | Stamm | 280/47.331 |
| 4,861,057 | A * | 8/1989 | Kunkle | 280/47.131 |
| 4,957,306 | A * | 9/1990 | Greenberg | 280/652 |
| 4,958,846 | A * | 9/1990 | Greenberg | 280/652 |
| 4,964,650 | A * | 10/1990 | Dickinson | 280/641 |
| 5,181,731 | A * | 1/1993 | Gustavsen | 280/47.131 |
| 5,242,189 | A * | 9/1993 | Osaki | 280/645 |
| 5,249,823 | A * | 10/1993 | McCoy et al. | 280/656 |
| 5,265,892 | A * | 11/1993 | Said | 280/30 |
| 5,330,212 | A * | 7/1994 | Gardner | 280/40 |
| 5,375,277 | A * | 12/1994 | Carr et al. | 5/625 |
| 5,460,307 | A * | 10/1995 | Stevenson | 224/153 |
| 5,687,978 | A * | 11/1997 | Rhodes et al. | 280/30 |
| 5,727,799 | A * | 3/1998 | DiSario | 280/47.3 |
| 5,820,141 | A * | 10/1998 | Wilkerson et al. | 280/30 |
| 5,882,023 | A * | 3/1999 | Swager | 280/47.131 |
| 5,887,879 | A * | 3/1999 | Chumley | 280/40 |
| 6,050,577 | A * | 4/2000 | Smith | 280/47.24 |
| 6,142,492 | A * | 11/2000 | DeLucia | 280/47.331 |
| 6,164,671 | A * | 12/2000 | Darling, III | 280/30 |
| 6,217,043 | B1 | 4/2001 | Chumley | 280/40 |
| 6,283,496 | B1 * | 9/2001 | Dickmann | 280/652 |
| 6,364,596 | B1 * | 4/2002 | Spencer et al. | 414/444 |
| 6,375,200 | B1 * | 4/2002 | Harter | 280/30 |
| 6,561,529 | B2 * | 5/2003 | Darling, III | 280/79.2 |
| 6,929,269 | B2 * | 8/2005 | Oliver | 280/47.18 |
| 7,017,939 | B2 * | 3/2006 | Darling, III | 280/652 |
| 7,017,940 | B2 * | 3/2006 | Hatfull | 280/652 |
| 7,032,921 | B2 * | 4/2006 | Swanner | 280/645 |
| 7,044,496 | B2 * | 5/2006 | Holmes | 280/639 |
| 7,059,616 | B2 * | 6/2006 | Wu | 280/47.24 |
| 7,082,632 | B2 | 8/2006 | Hood | |
| 7,150,465 | B2 * | 12/2006 | Darling, III | 280/640 |
| 7,172,207 | B2 * | 2/2007 | Henry | 280/651 |
| 7,407,177 | B2 * | 8/2008 | Darling, III | 280/640 |
| 7,448,632 | B1 * | 11/2008 | Nieto | 280/47.24 |
| 7,461,857 | B2 * | 12/2008 | Darling, III | 280/640 |
| 7,494,149 | B2 * | 2/2009 | Liu et al. | 280/639 |
| 7,637,550 | B2 | 12/2009 | Menna | |
| 7,661,683 | B2 * | 2/2010 | Fernandez | 280/47.24 |
| 7,676,861 | B2 * | 3/2010 | Ward et al. | 5/428 |
| 7,726,668 | B2 * | 6/2010 | Sieb et al. | 280/32.6 |
| 7,775,530 | B2 * | 8/2010 | Darling, III | 280/47.18 |
| 7,793,744 | B1 * | 9/2010 | Hardie | 180/19.1 |
| 7,963,531 | B2 * | 6/2011 | Panigot | 280/40 |
| 7,967,325 | B1 * | 6/2011 | Burton et al. | 280/656 |
| 2003/0080538 | A1 * | 5/2003 | Watts et al. | 280/652 |
| 2003/0205885 | A1 * | 11/2003 | Woods | 280/652 |
| 2003/0209886 | A1 * | 11/2003 | Darling, III | 280/652 |
| 2004/0080128 | A1 * | 4/2004 | Lindsey et al. | 280/30 |
| 2004/0108688 | A1 * | 6/2004 | Holmes | 280/640 |
| 2004/0155435 | A1 * | 8/2004 | Watts | 280/652 |
| 2005/0012308 | A1 * | 1/2005 | Swanner | 280/652 |
| 2006/0071450 | A1 * | 4/2006 | Wu | 280/642 |
| 2006/0076756 | A1 * | 4/2006 | Wu | 280/652 |
| 2006/0273554 | A1 * | 12/2006 | Henry | 280/652 |
| 2007/0029760 | A1 * | 2/2007 | Darling | 280/640 |
| 2007/0194542 | A1 * | 8/2007 | Dixon | 280/47.24 |
| 2007/0194560 | A1 * | 8/2007 | Zink | 280/652 |
| 2007/0252363 | A1 * | 11/2007 | Fernandez | 280/659 |
| 2008/0030003 | A1 * | 2/2008 | Darling | 280/651 |
| 2008/0197608 | A1 * | 8/2008 | Dixon | 280/654 |
| 2009/0051143 | A1 * | 2/2009 | Darling, III | 280/640 |
| 2009/0206566 | A1 * | 8/2009 | Enserink et al. | 280/35 |
| 2009/0212535 | A1 * | 8/2009 | Darling, Iii | 280/651 |
| 2010/0237111 | A1 * | 9/2010 | Mroczka | 224/156 |
| 2011/0049841 | A1 * | 3/2011 | Limontini | 280/640 |
| 2011/0309601 | A1 * | 12/2011 | Darling, III | 280/657 |

* cited by examiner

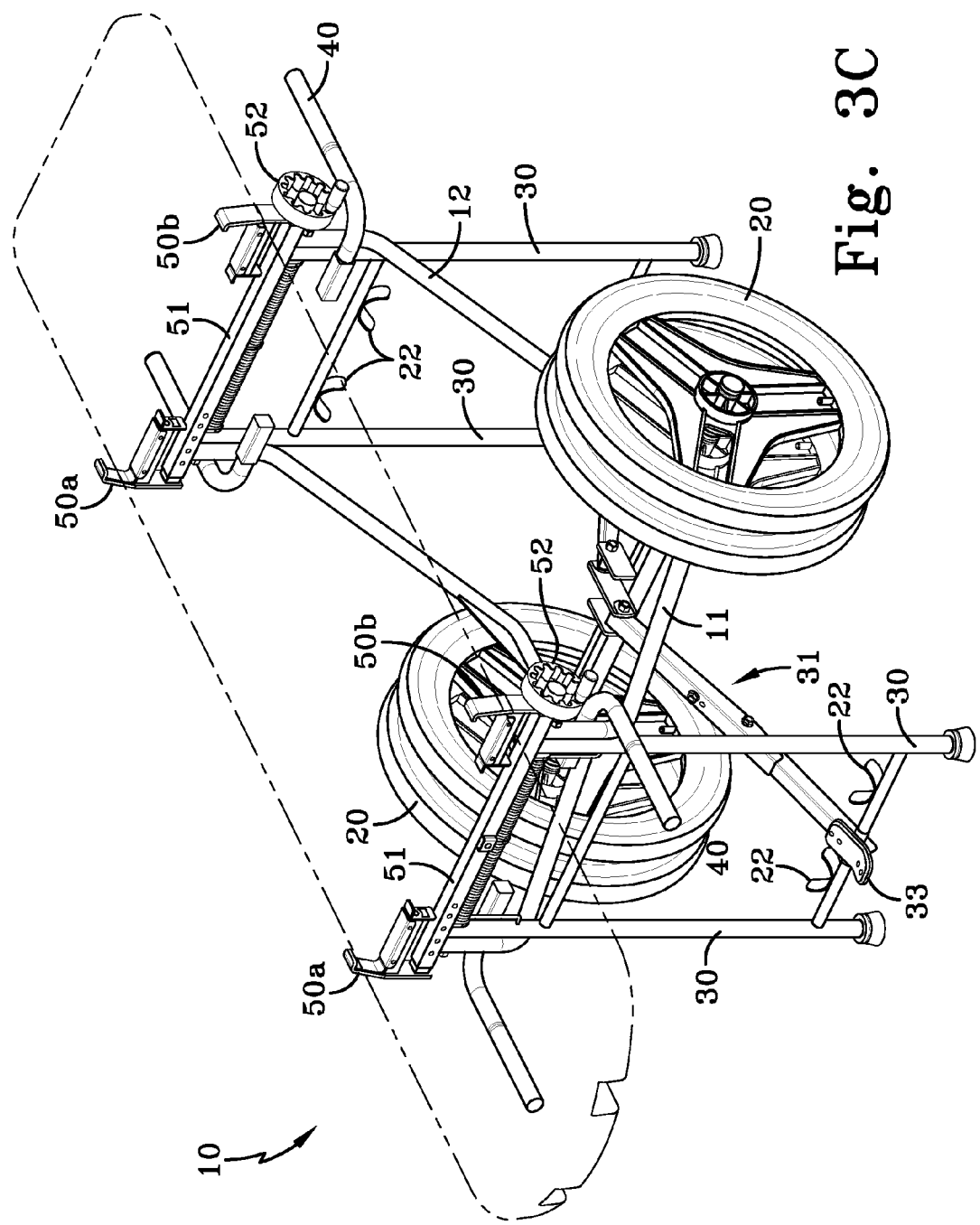

FIELD LITTER CARRIER

CROSS REFERENCE TO RELATED APPLICATIONS

This application claims the benefit of Utility Model Application number MI2009U000275, filed Aug. 27, 2009, with the Chamber of Commerce, Industry, Craft and Agriculture of Milan, IT, by the present inventor, Flavio Limontini, CEO of FLAMOR, s.r.l., with headquarters located at NOVARA (NO) VIA AGOGNA 20 28100 IT, which application is incorporated herein by reference. The applicant also claims the benefit of his patent application number P372/2010 filed Mar. 24, 2010, in the UAE, naming the same inventor. Applicant further claims the benefit of his patent application number 201030124921.1 filed Mar. 1, 2010 in China on behalf of the same inventor.

FIELD OF THE INVENTION

The present application relates generally to a field carrier for litters or stretchers used in the evacuation and transport of the injured. More particularly, the invention relates to a field stretcher carrier that is compatible with the stretchers currently in civilian or military use. This application further relates to a stretcher carrier that can also be adjustable to a mobile operational mode, wherein the stretcher carrier is readily convertible between manual carriage to wheeled transport.

BACKGROUND OF THE INVENTION

Medical stretchers can be difficult to maneuver, whether on a battlefield or in a hospital setting. Design of a stretcher holder must attend to concerns about patent comfort, welfare, reduced bumping and vibration which may aggravate trauma. Another consideration is the practicality of the device for patient transport by emergency personnel. Therefore, a lightweight, collapsible stretcher holder, that can sustain a variety of stretcher shapes would be most expedient.

The following prior art discloses the various aspects in the design of stretchers and associated devices.

Applicant's citation AA is U.S. Pat. No. 2,276,236, a STRETCHER SUPPORTING FRAME, granted Mar. 10, 1942, to George W. Latimer, which discloses a stretcher supporting frame to transport the sick or injured, wherein the support is a knock-down frame for storage in a relatively small space.

Citation AB is a STRETCHER HOLDER DEVICE FOR AMBULANCES, U.S. Pat. No. 4,006,500, granted Feb. 8, 1977, to Andre Bonifay, which comprises a frame with uprights and longitudinal cross-pieces to support individual stretchers.

The next citation AC titled STRETCHER CARRIER, is identified by U.S. Pat. No. 7,044,496, granted to David A. Holmes on May 16, 2006. The carrier comprises a support platform in horizontal position with a connected wheel support and a lockable foot prop that supports the stretcher on ground surface and pivots to facilitate movement of the carrier.

Applicant's citation AD, U.S. Pat. No. 7,082,632, granted Aug. 1, 2006, to Thomas W. Hood, discloses a COLLAPSIBLE, EXTENDABLE, TRACTION-PROVIDING, PORTABLE RESCUE DEVICE, that can stabilize a victim with cervical traction in the field and having removable, washable, easily cleaned padding.

Citation AE, U.S. Pat. No. 7,637,550, granted Dec. 29, 2009, to Ezio Menna, provides a STRETCHER AND A PATIENT TRANSPORT SYSTEM, with an automatically-raising stretcher that can be loaded and unloaded from ambulances, without the operatives having to support the weight thereof physically.

Citation AF, U.S. Pat. No. 7,676,861, granted Mar. 16, 2010, to Phillip Ward, et al., discloses a STRETCHER with cot sides and rails which prevent the patent from falling off or rolling off the stretcher.

Another example of the prior art for a field stretcher carrier is that produced in the past by the United States Armed Forces to transport patients on stretchers within field hospitals, or from the first aid station to a helipad and vice versa. The requirement was to easily move patients around in the modular structures, which are formed of tents and therefore do not have smooth flooring.

This prior art stretcher carrier was fitted with wheels of a sufficient diameter to pass over both the barriers between the tents and the rugged terrain near the field hospitals. This terrain is very often uneven, with stones, grass and the like, as well as being exposed to the local atmospheric conditions, i.e. mud, water and snow.

The original stretcher carrier was designed solely for carrying ECO-type stretchers with set measurements in compliance with NATO standards. Its structure was made of aluminum and the wheels were fitted with inner tubes and rims with spokes.

However, a stretcher or litter carrier of this kind has various limitations and drawbacks. First of all, a huge variety of stretchers are used in military and civilian environments. This heterogeneity concerns not only their dimensions, but also their structures, which have varying degrees of rigidity. It is therefore clear that a prior art stretcher carrier of the type described above is not suitable for use with all types of stretchers.

The aluminum structure of the prior art stretcher carrier makes it light and sturdy, but also means that special welding equipment is needed to repair the structure in the event of breakage. Furthermore, the use of wheels with spokes means that the spoke tension has to be checked regularly.

Therefore, the prior art stretcher carrier may require frequent maintenance work. If this work is not carried out, the stretcher carrier may turn out to be unusable at the very time when it becomes indispensable.

Considering the above, the purpose of the present invention is to offer an improved and more versatile field stretcher carrier which overcomes the limitations and the drawbacks of the prior art stretcher carriers.

A primary object of the present invention is a field stretcher carrier, i.e. a structure with wheels that allows patients lying on stretchers to be transported across rough, uneven terrain such as earth, grass, gravel, sand, snow and places without smooth flooring in general, for example field hospitals and sites where first aid is given, in both military and civilian situations.

Another object of the present invention is to offer a field stretcher carrier that is compatible with all of the types of stretcher's currently in civilian and military use.

Still another aim of the present invention is to provide a field stretcher carrier that minimizes the amount of maintenance work necessary, thus also reducing the risk that it will be unusable at the time when it is actually needed.

A further aim of the present invention is to provide a field stretcher carrier that takes up little storage space, but can also be rapidly assembled and made operational.

These and other objectives are achieved by the invention in the form of a field stretcher carrier as described in claim 1. Other distinctive characteristics of the invention are described in the respective subordinate claims.

SUMMARY OF THE INVENTION

A field stretcher carrier of this invention features a structure formed by a front frame section and a rear frame section that are coupled together, as well as a pair of wheels with an axle that is substantially centrally located with respect to the front and rear sections of the frame. The attachment means that allows a stretcher to be secured to the structure preferably includes at least one pair of clamps at the ends of each frame section. The clamps are fitted to a rigid cross bar and can slide up and down the axis of the rigid cross bar towards and away from each other.

The clamps can be opened, closed and locked in position, to accommodate and firmly secure stretchers of various sizes to the structure. The rigid cross bars, which are present on both the front and the rear sections of the frame, also provide a solid support base for rigid stretchers, such as the long spine boards that are currently in standard use for emergency civilian healthcare.

In the preferential version of the product, at least one of the clamps in each pair has a push locking system that allows the clamp to be locked in a number of separate positions. The other clamp in each pair is operated with a maneuvering wheel that allows continual, gradual adjustment, so as to make the process of attaching the stretcher to the structure particularly rapid and easy. Indeed, it is necessary to bear in mind that this process can also take place in emergency situations, in which time is a decisive factor for saving patients.

The stretcher carrier in the invention also features a number of means for quick locking and release, allowing it to go from being unassembled or folded up (and therefore occupying minimal space) to an assembled state ready for use. This means that it takes up limited space in storage and it can be quickly and easily made operational when it is necessary to use it.

Further features and benefits of the present invention will be made clearer by the following description, which is provided for illustrative purposes with reference to the enclosed drawings.

BRIEF DESCRIPTION OF THE DRAWINGS

FIG. 3C is a perspective view of the carrier equipped with two wheels on each side;

DETAILED DESCRIPTION OF THE INVENTION

Figure 1:
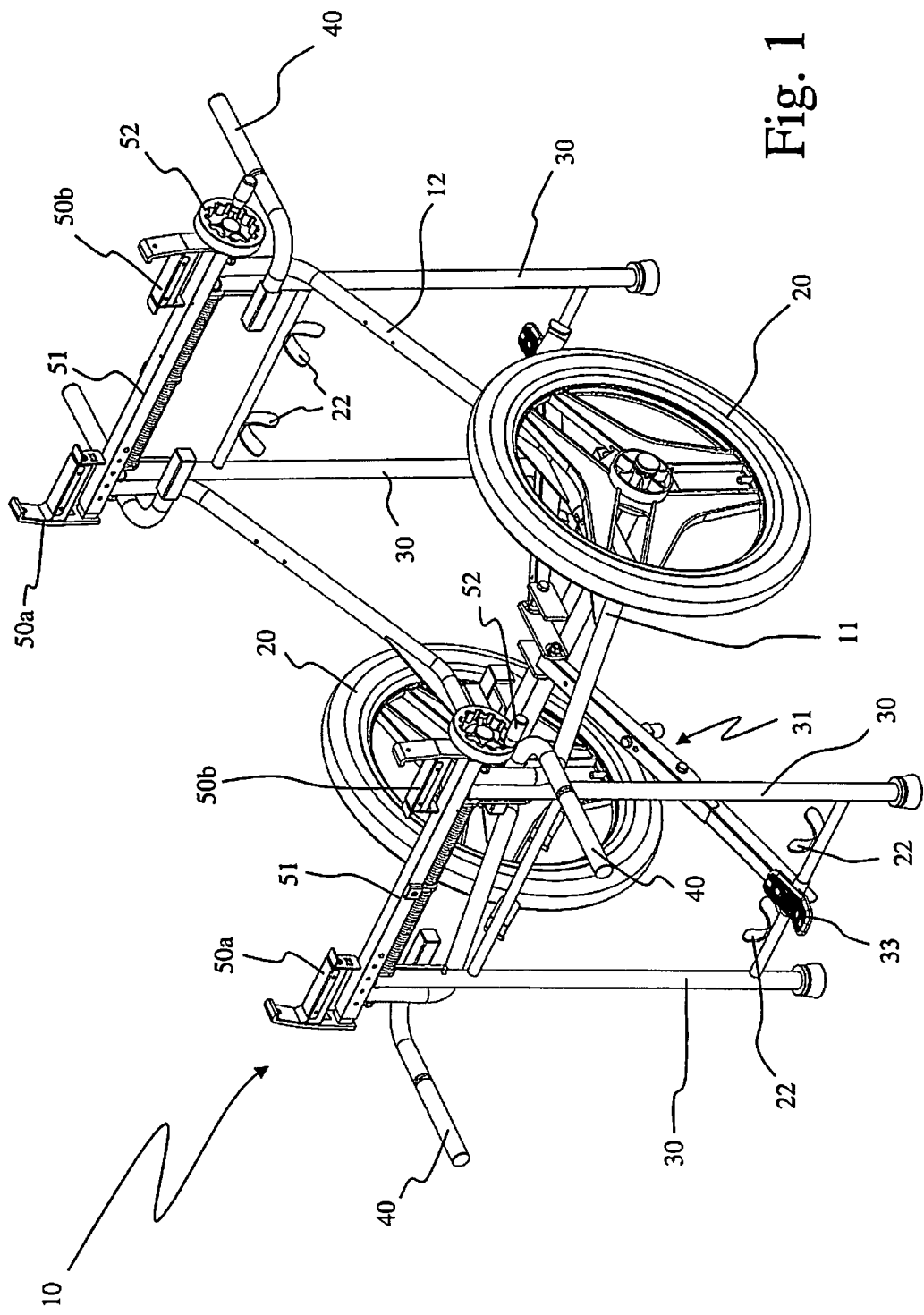
FIG. 1 is a perspective view of the field stretcher carrier of the invention.
Figure 2:
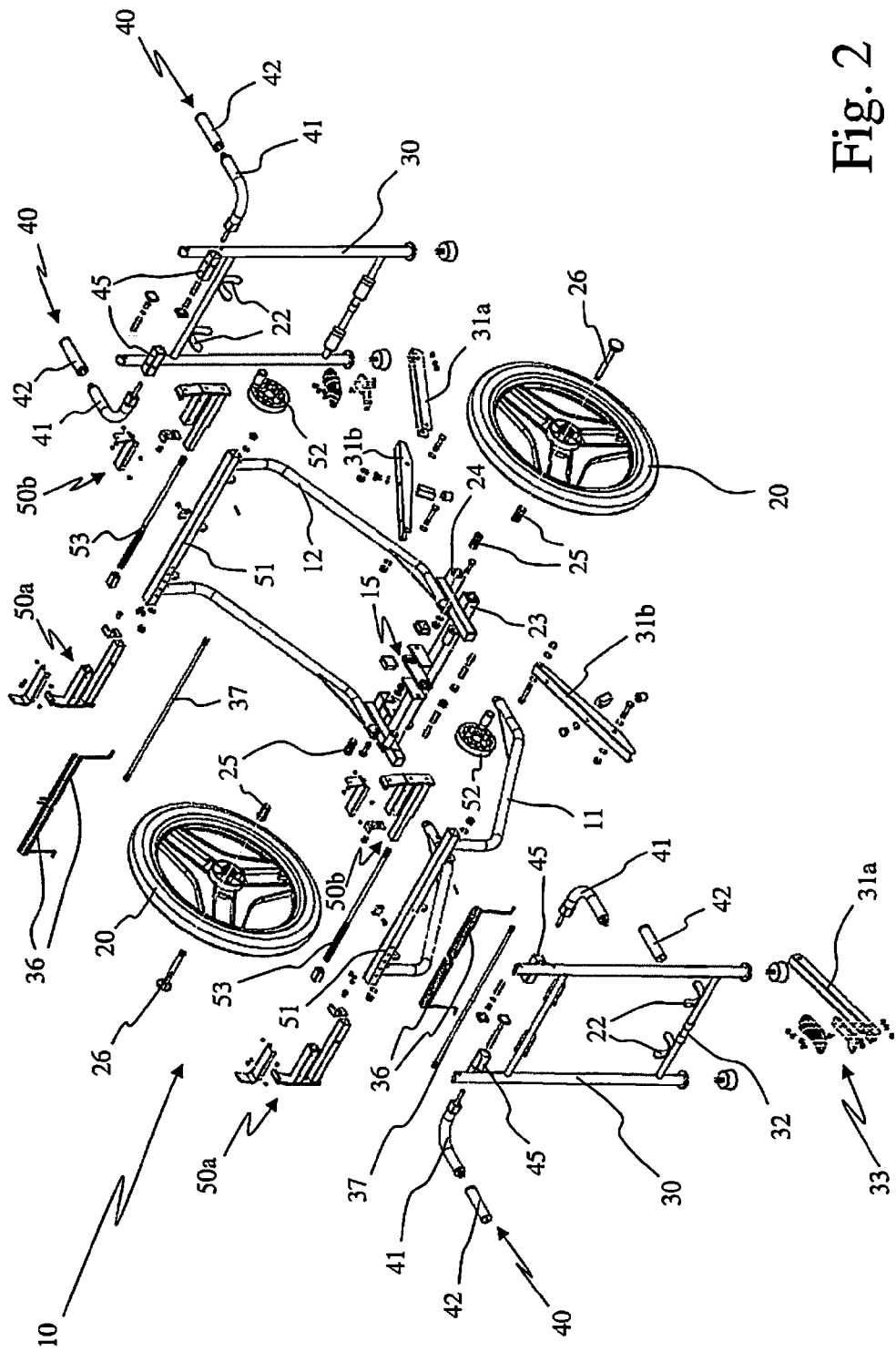
FIG. 2 is an exploded perspective view showing the components of the field stretcher carrier in FIG. 1.

With reference to FIGS. 1 and 2, the field stretcher carrier of the invention essentially consists of a structure 10 made up of a front frame section 11 and a rear frame section 12 that are pivotally coupled together in the centre of the structure 10 with a pair of bolts. Here and below, it will be accepted that the front frame section 11 is the part that supports the stretcher on the side where the patient's head is lying and the rear frame section 12 is the side on which the patient's feet are lying.

Both the front frame section 11 and the rear frame section 12 feature at least one pair of support legs 30 that can be moved from an operative upright support position perpendicular to the underlying surface or ground to a closed, storage position raised up from the surface or ground.

Each pair of legs 30 is connected with a pin 37 to its respective section of the frame and can be rotated. Each pair of legs 30 is also connected to the central part or section of the structure 10 with a central arm 31. Each central arm 31 consists of two levers 31a and 31b that are both articulated to a shared end at the center section. Lever 31a is hinged at the fulcrum to an axle 32 of a pair of legs and has a control pedal 33 on its end. At the opposite end to that articulated to lever 31a, lever 31b is hinged at 15 to the structure of the frame and, in particular, to the central connecting cross bar of the frame section 15.

Also connected to the pairs of legs 30 are the transport handles 40, each of which essentially consists of a curved arm 41 on which end sections 42 of various lengths can be mounted, as can special end sections such as parts for attachment to motor vehicles or similar devices.

In addition to the operating position illustrated in FIG. 1, the handles 40 can be rotated to a second position suitable for storage (downwards) and a third position suitable for lifting (inwards). The attachment end of each curved arm 41 has an end portion with a square cross section that is fitted into housing 45 with a matching cross section that is an integral part of the respective pair of legs 30. A spring torsion/traction mechanism 36 allows reposition of each handle 40 with successive orthogonal movements: in practical terms, to attain the desired position, the handle 40 must be pulled out of the housing 45 and turned 90°, or by multiples of 90°, before being replaced in the same housing 45.

Structure 10 also includes a pair of wheels 20 positioned in the lower part with an axle that is substantially centrally located with respect to the two sections of the frame 11 and 12.

The wheels 20 are made up of a glass-reinforced polypropylene rim and have six thick spokes, which means there is no need for maintenance to ensure that the spoke tension is correct. There is a wide tread on the cover, with reinforcement studs. In the non-operational mode, when the stretcher carrier is disassembled for storage, the wheels 20 fold up into the structure 10 (FIGS. 4G and 4H) and are held in position with four U-shaped housing sections 22 welded to the structures of the pairs of legs 30 in the upper and lower parts of the structures respectively.

As can be seen in FIG. 2, in the lower part of the carrier 10 there are two pairs of housings 23 and 24 for the axles of the wheels 20. One pair of housings 23 has a substantially symmetrical axis with respect to the center of the frame, while the other pair of housings 24 has an axis which is off-center by a pre-established distance (approximately 8.5 cm), in a position opposite the end with the patient's head.

Inside the housings 23 and 24 there are bushings 25 to accommodate the pin 26 of each wheel 20. Each bushing 25, together with the relative pin 26, makes up a Quick Release System® for each wheel 20. This system makes it quick and simple to release and mount the wheels 20.

The stretcher attachment systems include at least one pair of clamps 50a and 50b on the ends of each part 11 and 12 of the frame. The clamps 50a and 50b in each pair are fitted to a rigid cross bar 51 and can slide up and down the axis of the cross bar towards and away from each other.

The union of the two frame sections 11 and 12 therefore provides a device with a number of support and fixing points, i.e. the four clamps 50a and 50b. The pair of clamps 50a and 50b fitted on the frame section 11 are colored red to show the position of the patient's head.

Figure 3A:
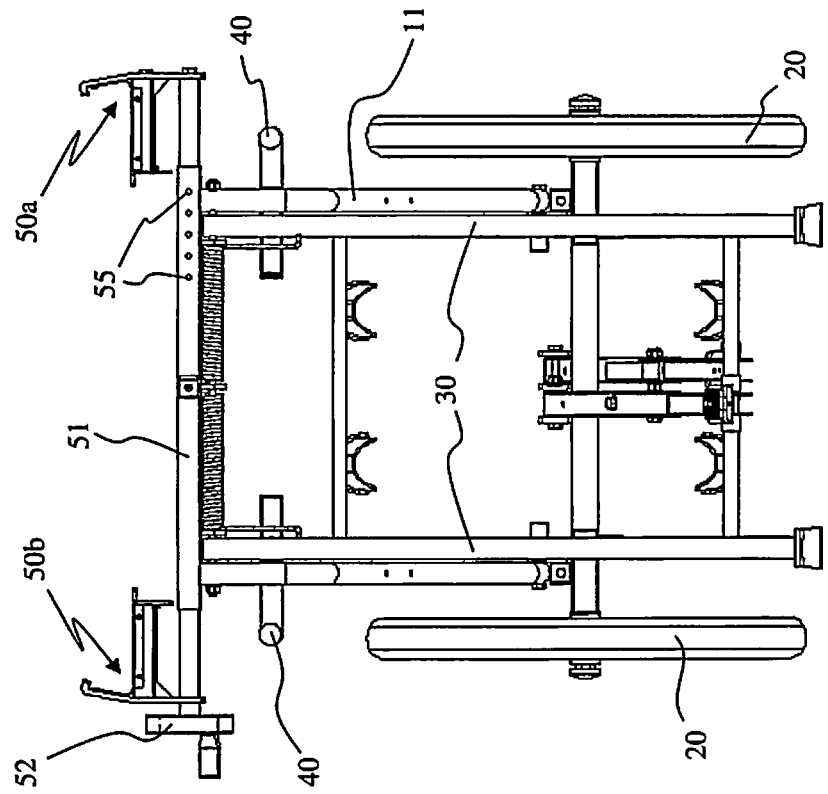
FIGS. 3A and 3B are front views from above of the field stretcher carrier in FIG. 1 which show different adjustment conditions for the stretcher attachment clamps.
Figure 3B:
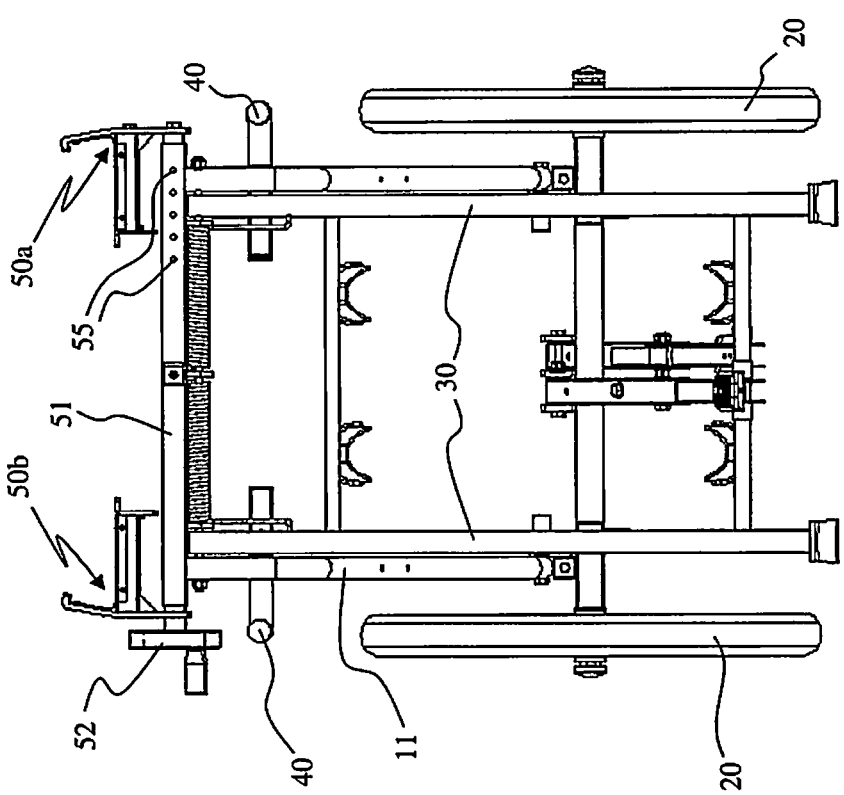

The prototype that was actually made was capable of carrying stretchers with widths varying from approximately 45 cm, about 17.72", (FIG. 3A) to approximately 65 cm, about 25.6", (FIG. 3B).

The clamps 50a on one side of the stretcher carrier structure 10 can slide along the axis during opening/closing and can be locked in a number of separate positions with a push locking system, for example of the type fitted with a button that can be inserted in any one of a number of holes 55, with the button being kept in the hole by a pushing spring element. The clamps 50b on the other side of the structure 10 are operated with a maneuvering wheel 52 that allows continual, gradual adjustment. The combination of these different systems for clamps 50a and 50b allows precise opening/closing adjustment, whereby the stretcher carrier of the invention can support and secure stretchers and loads of non-standard dimensions.

Each maneuvering wheel 52 is connected to a threaded pin 53 onto which the base sections of the clamps 50b that slide on the rigid cross bar are fitted. The base sections of the clamps 50b have an appropriately threaded hole in them.

The pair of rigid cross bars 51 also provides a support surface for rigid stretchers, such as the long spine boards that are in standard use for emergency civilian healthcare. The support surface for rigid stretchers is lower than the attachment level for other types of stretchers.

The maneuvering wheel 52 preferably has a diameter of 100 mm, about 3.94", or more to make the opening and closing movement for the stretcher securing clamps 50b easy and quick.

In addition, on each clamp 50a, i.e. the ones with a push locking system, there are some threaded holes that can be used for attaching tools or accessories, such as a drip pole, a monitor holder, an oxygen tank bracket or other similar items.

Figure 4A:
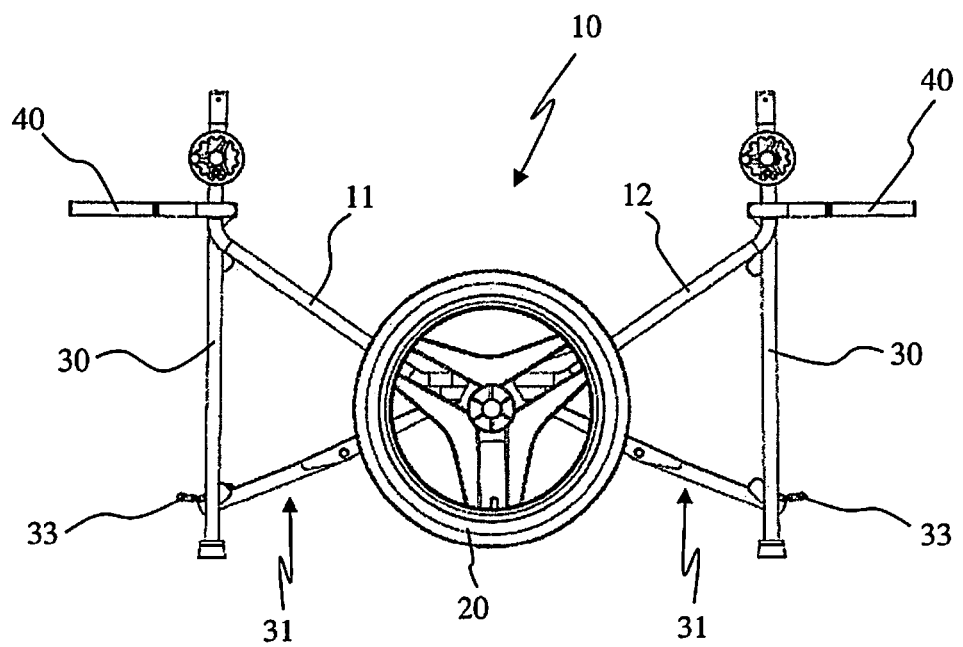
FIGS. 4A to 4H illustrate the basic stages in the procedure for converting the stretcher carrier of the invention from operational mode to storage mode.
Figure 4B:
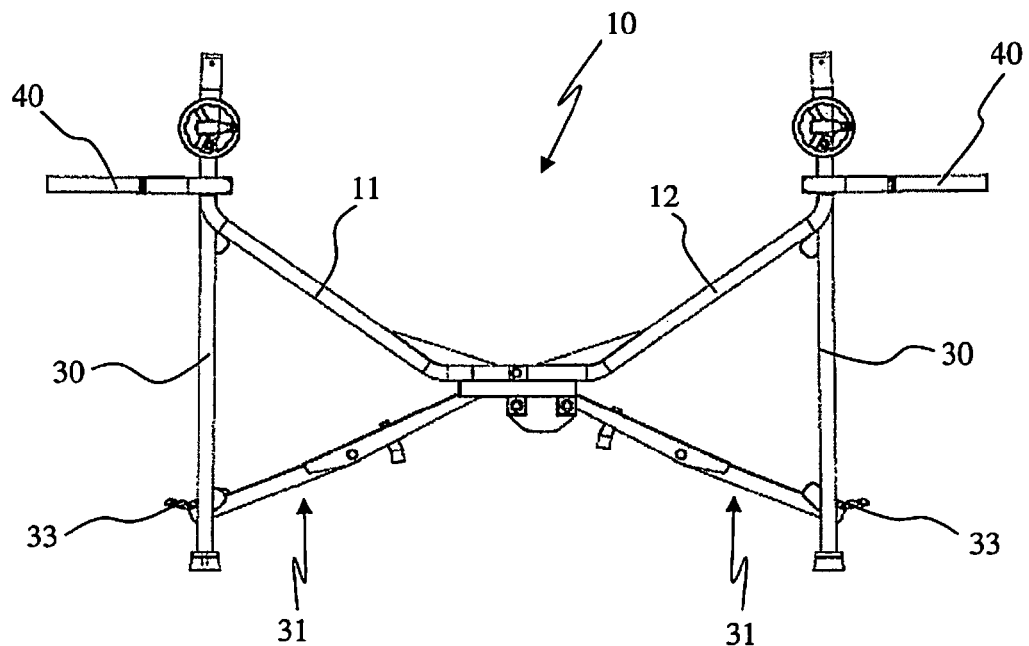
Figure 4C:
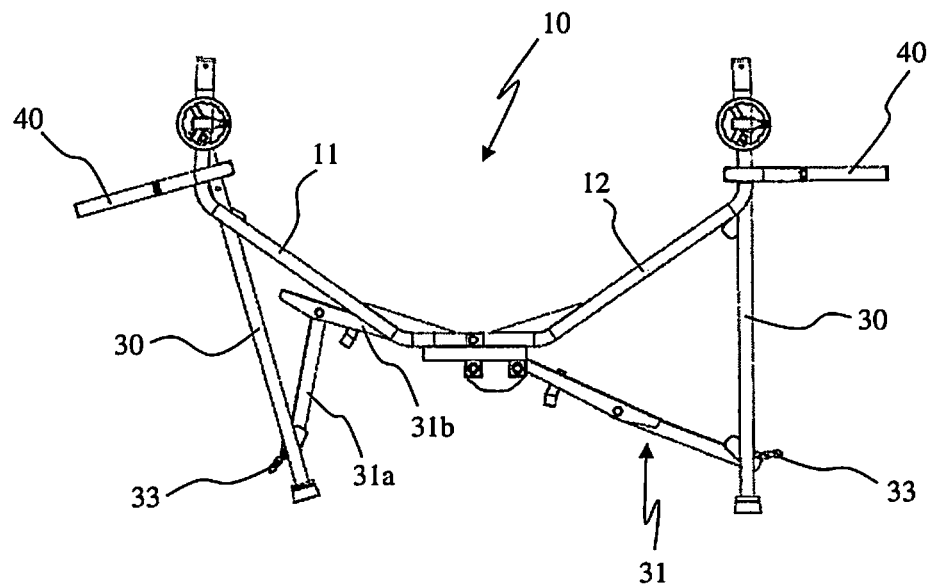
Figure 4D:
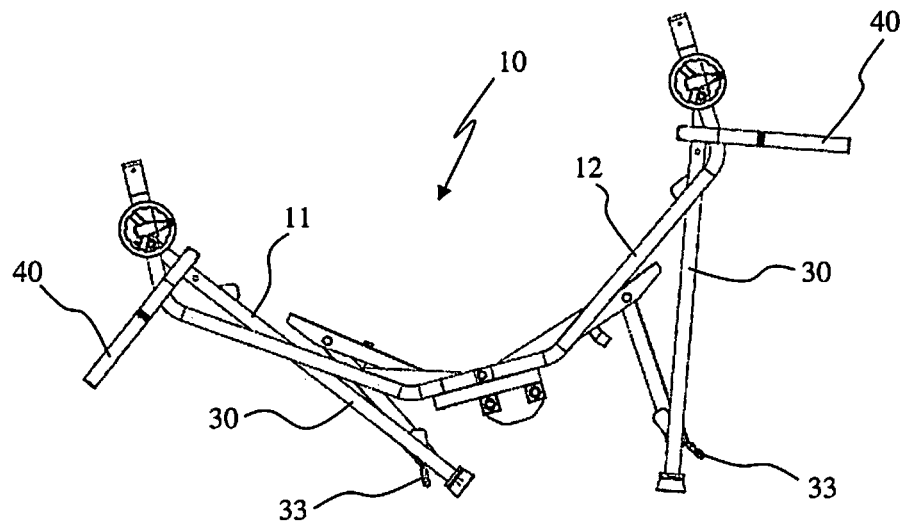
Figure 4E:
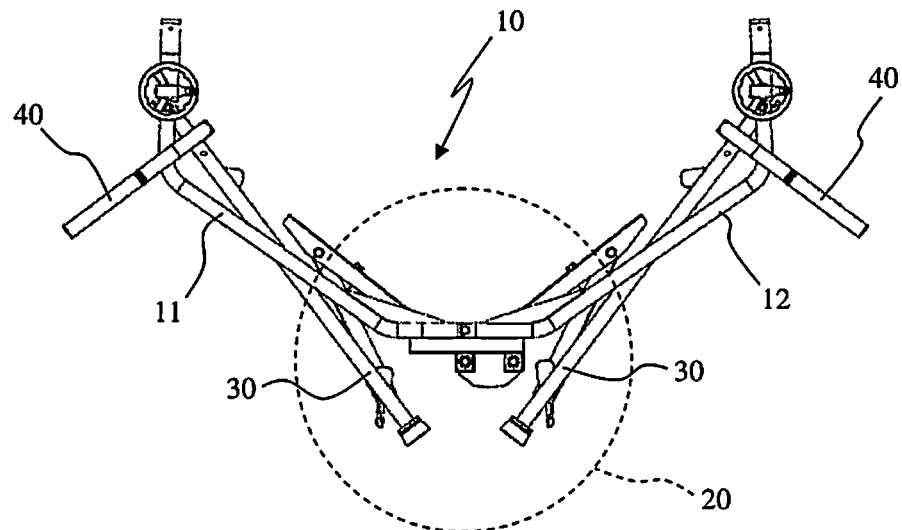
Figure 4F:
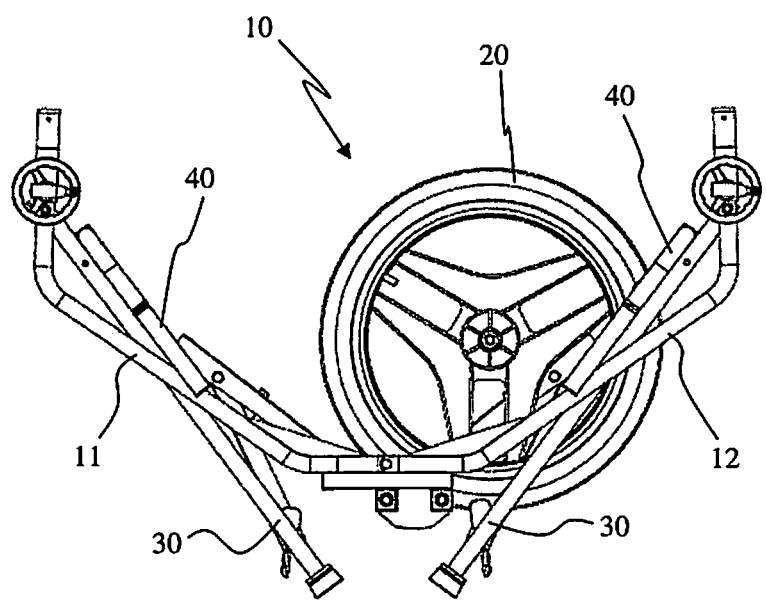
Figure 4G:
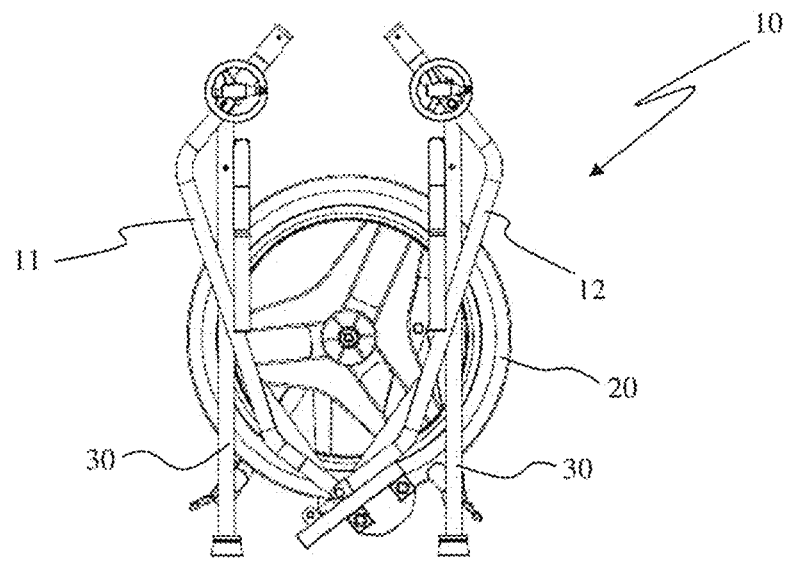
Figure 4H:
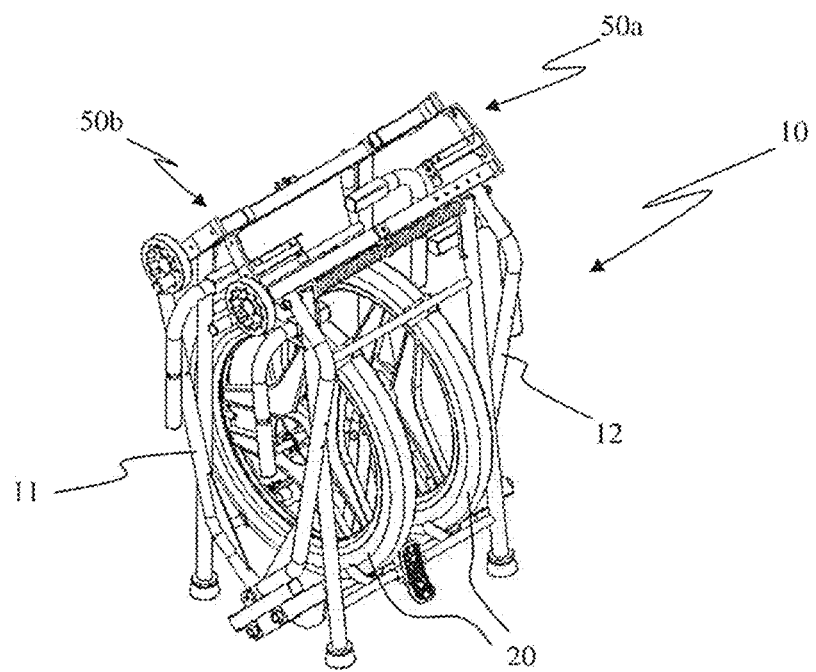

FIGS. 4A-4H show the sequence of procedures to convert the structure 10 from its stable operational mode, shown in FIG. 4A, to the storage mode, shown in FIG. 4H.

In the stable operational mode, the pairs of legs 30 of the structure 10 are perpendicular and resting on the ground. The handles 40 are horizontal and their free ends are pointing towards the outside of the structure 10.

The first step is to remove the wheels 20 with the Quick Release System® pins 26, then put the structure 10 in the position shown in FIG. 4B.

The pairs of legs 30 are then folded away, for example by folding inwards the pair of legs 30 connected to the frame section 11 (FIG. 4C), then the pair connected to the frame section 12 (FIG. 4D) to get to the intermediate position shown in FIG. 4E.

It should be emphasized that in addition to the "stable" operational mode shown in FIG. 4A, the stretcher carrier in the invention can also be converted to a "mobile" operational mode, i.e. a mode that allows the stretcher carrier and the stretcher attached to it to be transported. In the "mobile" operational mode, the structure 10 is in the position shown in FIG. 4E, but with the wheel 20 secured to the structure itself (as represented here for clarity with a dashed line showing the space occupied).

To fold away each pair of legs 30, it is necessary to press the control pedal 33 in the centre of them: this action will make it easier to fold the arm 31 and the shared end of the levers 31a and 31b. The folding of each pair of legs 30 is aided with steel springs 36 on each pin 37, around which there is rotation of the relative pair of legs 30 for the frame section to which it is fitted (FIG. 2).

Once the stage depicted in FIG. 4E is reached, the handles 40 can be moved to a suitable position for storage, as shown by FIG. 4F, and both of the wheels 20 can be fitted inside the structure 10 in the special housings 22 (FIGS. 1 and 2).

The two frame sections 11 and 12 can then be rotated around their central fixing point to close up the wheels 20 in the structure 10 until the pairs of legs 30 are once again perpendicular to the ground (FIG. 4G) and, continuing with the rotation, until there is mutual contact between the clamps 50a and 50b joined to each of the frame sections 11 and 12.

To return the structure 10 to the operational mode shown in FIG. 4A, it is necessary to go through the same sequence of steps described thus far in reverse. In short, starting from the position in FIG. 4H, the frame sections are rotated away from each other to allow the removal of the wheels 20 and then the extraction of the pairs of legs 30.

To extract each pair of legs 30, it is necessary to move the handles 40 from the position in FIG. 4F to the position in FIG. 4E, and then pull the 9 handles until the central support arm 31 is fully extended, i.e. in the position in which each pair of legs 30 is kept perpendicular to the ground.

As an example, a prototype of the invention that was actually made is capable of accommodating ECO-type stretchers or similar with a minimum width of 45 cm, about 17.72", and a maximum width of 65 cm, about 25.6", i.e. a sufficiently broad adjustment range to accommodate the numerous stretcher models that are currently available on the market. In addition, the surface provided by the two rigid cross bars 51 also means it can accommodate rigid stretchers with widths varying from approximately 30 cm, about 11.8", to approximately 45 cm, about 17.72".

The prototype of the invention is preferably made with a sealable tubular metal structure occupying 62 cm×146 cm/156 cm×87 cm in operational mode, while in storage mode the overall space occupied is reduced to 62 cm×52 cm×85 cm, i.e. a smaller space compared to the prior art stretcher carrier, thus allowing the storage of five stretcher carriers as per the invention in the same pace that would be occupied by four of the prior art ones. This benefit can be seen not only in storage but also in transport.

The structure of the prototype of the stretcher carrier as per the invention is mainly made of iron tubes and bars which are appropriately protected and/or treated against rust, rather than aluminum as suggested by the prior technique. Any repairs and/or maintenance work can therefore easily be carried out with normal welding equipment.

The overall weight difference compared to the prior art stretcher carrier is not perceptible and the use of wheels made of a composite material compensates for the greater weight of the metal structure.

Various modifications can be made to the forms of production described herein while still remaining within the scope of the invention. For example, the materials and dimensions may vary depending on certain requirements, and the various threaded attachment elements may be replaced with quick locking/release systems, for example push locking systems, clips and similar systems.

What is claimed is:

1. A field stretcher carrier comprising a structure formed by a front frame section and a rear frame section that are coupled together, the front and rear sections having at least one pair of legs connected by a pin to its respective section of the frame; the at least one pair of legs rotatable from an upright support position perpendicular to the underlying ground, to a mobile operational mode, wherein the legs are angled to the ground, and to a closed storage mode with the legs again perpendicular to the ground; a spring joined to each leg, positioned on each pin and suspended between the at least one pair of legs, aids in folding the legs; each pair of legs linked to a lower part of the frame by a central arm.

2. A field stretcher carrier as defined in claim 1, each central arm comprising two articulated levers, is pivotally joined to a central connecting cross bar with an opposite end of each central arm hinged at a fulcrum to an axle of a pair of legs, the central arm having a control pedal on both center arm ends, such that a foot pressure on the control pedal facilitates folding the articulated levers which allows folding the center arm at a shared end of the levers.

3. A field stretcher carrier as defined in claim 2, further comprising at least one pair of wheels and a pair of housings for the wheels, one pair of housings having a symmetrical axis with a center of the frame and the other pair of housings having an axis which is off-center of the frame.

4. A field stretcher carrier according to claim 3, wherein the separately spaced housings can position the wheels along at least two distinct parallel axes.

5. A field stretcher carrier as defined in claim 4, further comprising a bushing inside each housing that receives a pin for each wheel, wherein the bushings and corresponding pins provide a quick release system for quick and simple mounting and release of the wheels.

6. A field stretcher carrier as defined in claim 5, wherein the stretcher carrier includes a heterogeneity in relation to dimensions and degree of rigidity of stretchers, the carrier having movable attachment means.

7. A field stretcher carrier as defined in claim 6, the movable attachment means comprising clamps that slide along a rigid cross bar, and clamps urged by a maneuvering wheel on a threaded pin that allow continual, gradual adjustment to secure a stretcher.

8. A field stretcher carrier as defined in claim 7, wherein a diameter of the maneuvering wheel is 100 mm, (3.94"), or more, whereby opening and closing the stretcher securing clamps is quick and easy.

9. A field stretcher carrier as defined in claim 8, wherein at least one of the clamps includes push locking means for clamp securement in a number of separate positions designated by a series of holes in the cross bars.

10. A field stretcher carrier according to claim 9, wherein a pair of handles connects to each pair of legs and the handles are mobile and lockable in two or more positions.

11. A field stretcher carrier according to claim 10, wherein the wheels have rims that are made of composite materials and have a number of spokes.

12. A field stretcher carrier according to claim 11, wherein the structure is made at least in part of iron bars and/or tubes.

13. A field stretcher carrier as defined in claim 12, wherein the movable attachment means is adjustable for carrying stretchers having widths varying from 45 cm, (17.72"), to 65 cm, (25.6").

14. A field stretcher carrier as defined in claim 13, wherein the structure while in storage mode has an overall space occupied that is reduced to 62 cm×52 cm×85 cm, or (24.409")×(20.472")×(33.4645").

15. A field stretcher carrier as defined in claim 14, further comprising two pair of wheels.

16. A field stretcher carrier as defined in claim 15, wherein the wheels are concentric.

17. A field stretcher carrier as defined in claim 14, wherein the structure while in storage mode the wheels are fitted within a cavity formed by the folded carrier in a stabilized position within the structure.

18. A field stretcher carrier as defined in claim 17, wherein there is mutual contact between the clamps joined to each of the frame sections while the structure is in storage mode.

19. A method for using a field stretcher carrier as defined in claim 18, comprising the steps of:
   a. repositioning the field stretcher carrier from an upright support mode through an operational mode, and to a storage mode;
   b. folding the pairs of legs by pressing the control pedal in the center of them;
   c. rotation of a bottom portion of both pairs of legs toward a carrier center for an operational mode configuration of the carrier;
   d. removing the wheels with quick release of the pins;
   e. moving the handles to a suitable position for storage;
   f. fitting the wheels in special housings of the carrier, within a cavity formed by the folded carrier; and
   g. rotating the front and rear frame sections around a central fixing point to close up the wheels in the carrier until the pairs of leg are once again perpendicular to the ground and there is mutual contact between the clamps joined to each of the frame sections.

* * * * *